I. L. KING.
Fruit-Picker.

No. 214,780. Patented April 29, 1879.

Witnesses
Fred. G. Dieterich
George Binkenburg

Inventor
Isaac L. King
by Louis Bagger & Co.
his Attorneys

UNITED STATES PATENT OFFICE.

ISAAC L. KING, OF EAST FREEDOM, PENNSYLVANIA.

IMPROVEMENT IN FRUIT-PICKERS.

Specification forming part of Letters Patent No. 214,780, dated April 29, 1879; application filed September 23, 1878.

*To all whom it may concern:*

Be it known that I, ISAAC L. KING, of East Freedom, in the county of Blair and State of Pennsylvania, have invented certain new and useful Improvements in Fruit-Pickers; and I do hereby declare that the following is a full, clear, and exact description of the invention, which will enable others skilled in the art to which it appertains to make and use the same, reference being had to the accompanying drawings, which form a part of this specification, and in which—

Figure 1:
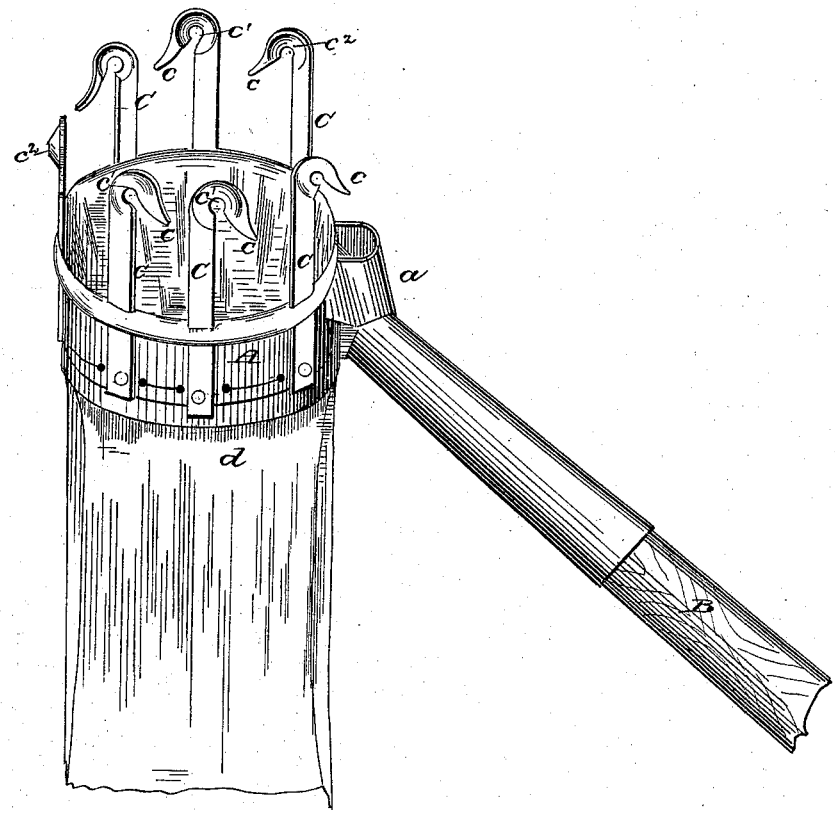
Figure 2:
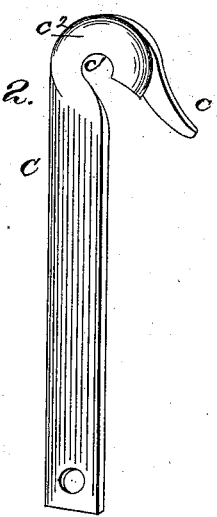

Figure 1 is a perspective view of my improved fruit-picker, and Fig. 2 is a detached perspective view of one of the pickers proper.

The same part in the two figures is denoted by the same letter.

This invention appertains to certain improvements in fruit-pickers, by which the fruit can be conveniently picked while the person is standing on the ground; and it consists, particularly, in the construction of the pickers proper, they being made in a swan-bill shape, with laterally-tapering extensions and sharpened eye-shaped knives, substantially as hereinafter more fully set forth.

In the drawings, A refers to a ring or band of any suitable construction, and provided with a handle-socket, $a$, tapering toward its secured end. B is the handle, of a length sufficient to enable the person using the picker to reach the most distant as well as the nearest limb with its fruit which it is desired to gather or pick. The handle B is inserted into the socket $a$, into which it is fastened in any suitable or practicable way. C C refer to a series of pickers fastened to and around the ring or band A by riveting or otherwise, and projecting some distance above the said ring or band, to permit of bringing the same into contact with the fruit. The upper ends of these pickers are of a swan-bill shape—*i. e.*, having outwardly-curved hooks $c$, to facilitate the grasping of the stem of the limb with the fruit, and, by pulling upon the picker, the drawing of it toward the person using it. At the inner ends or bowls of the hooks $c$ are eye-shaped knives $c^1$, which, as the hook $c$ grasps the stem of the fruit, will cut said stem and allow the fruit to fall into the bottomless receptacle $d$, of canvas or other textile material, whence it may be gathered for sale or use.

The exterior sides of the pickers C are provided with lateral tapering extensions $c^2$, which, it will be observed, when the pickers are brought into contact with the fruit, enter the eyes or concavities thereof, and thus permit of the cutting of the stem near the fruit, leaving the greatest possible amount of stem remaining, the eye-shaped knives $c^1$ being made in the said tapering portions of the pickers.

The inside of the picker may be lined with any suitable or soft substance to prevent the bruising of the fruit, which purpose the canvas or textile bottomless receptacle also serves in connection with the gathering of the fruit.

This device is exceedingly simple, easily constructed, and cheap.

Having thus fully described my invention, I claim and desire to secure by Letters Patent of the United States—

In a fruit-picker, the picker proper, C, having a swan-bill shape—*i. e.*, having the hook $c$ and eye-shaped knife $c^1$ with or without lateral tapering extension $c^2$, substantially as and for the purpose set forth.

In testimony that I claim the foregoing as my own I have hereunto affixed my signature in presence of two witnesses.

ISAAC L. KING.

Witnesses:
JAMES E. BUTLER,
JOHN T. CRIST.